(12) United States Patent
Schepp et al.

(10) Patent No.: US 12,361,759 B2
(45) Date of Patent: Jul. 15, 2025

(54) CONTROL APPARATUS ALLOWING A USER TO INPUT OPERATIONS

(71) Applicant: HONDA MOTOR CO., LTD., Tokyo (JP)

(72) Inventors: Cheree Anne Schepp, Offenbach/am Main (DE); Helge Wagner, Offenbach/am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 213 days.

(21) Appl. No.: 18/098,320

(22) Filed: Jan. 18, 2023

(65) Prior Publication Data

US 2023/0249552 A1  Aug. 10, 2023

(30) Foreign Application Priority Data

Feb. 9, 2022  (JP) .................................. 2022-018816

(51) Int. Cl.
| | | |
|---|---|---|
| *G09G 3/04* | (2006.01) | |
| *B60K 35/00* | (2006.01) | |
| *G06V 40/10* | (2022.01) | |
| *G06V 40/20* | (2022.01) | |
| *B60K 35/10* | (2024.01) | |
| *B60K 35/65* | (2024.01) | |

(Continued)

(52) U.S. Cl.
CPC ............. *B60K 35/00* (2013.01); *G06V 40/10* (2022.01); *G06V 40/28* (2022.01); *B60K 35/10* (2024.01); *B60K 35/65* (2024.01); *B60K 35/81* (2024.01); *B60K 2360/117* (2024.01); *B60K 2360/119* (2024.01); *B60K 2360/1464* (2024.01); *B60K 2360/731* (2024.01); *G06F 3/048* (2013.01)

(58) Field of Classification Search
CPC .. B60K 35/00; B60K 2360/117; B60K 35/65; B60K 35/81; B60K 35/10; B60K 2360/731; B60K 2360/119; B60K 2360/1464; G06V 40/10; G06V 40/28; G06F 3/048–04897
See application file for complete search history.

(56) References Cited

U.S. PATENT DOCUMENTS

| | | | |
|---|---|---|---|
| 8,886,399 B2 * | 11/2014 | El Dokor | ................ G06F 3/005 345/158 |
| 2012/0162100 A1 * | 6/2012 | Chang | ................. G06F 3/04166 345/173 |

(Continued)

FOREIGN PATENT DOCUMENTS

JP  2018132824 A  8/2018

*Primary Examiner* — Roy P Rabindranath
(74) *Attorney, Agent, or Firm* — Thomas Horstemeyer, LLP

(57) ABSTRACT

A control apparatus for providing a user interface to a user is provided. The apparatus comprises a display control unit configured to display a selectable object on a display apparatus, a detection unit configured to analyze an image of a hand of the user to detect a position of the hand, a specifying unit configured to specify an indicated position in the display apparatus based on the position of the hand, and a processing unit configured to, based on the indicated position overlapping the selectable object, execute processing associated with the selectable object. The display control unit further displays, in the display apparatus, a cursor that indicates the indicated position.

13 Claims, 9 Drawing Sheets

(51) Int. Cl.
 *B60K 35/81* (2024.01)
 *G06F 3/048* (2013.01)

(56) References Cited

U.S. PATENT DOCUMENTS

| | | | |
|---|---|---|---|
| 2014/0365228 A1* | 12/2014 | Ng-Thow-Hing | G06F 3/017 |
| | | | 704/275 |
| 2018/0137837 A1* | 5/2018 | Peana | H05B 47/00 |
| 2020/0301513 A1* | 9/2020 | Mejia Cobo | G06F 3/011 |
| 2022/0408164 A1* | 12/2022 | Lee | G06F 3/0304 |

* cited by examiner

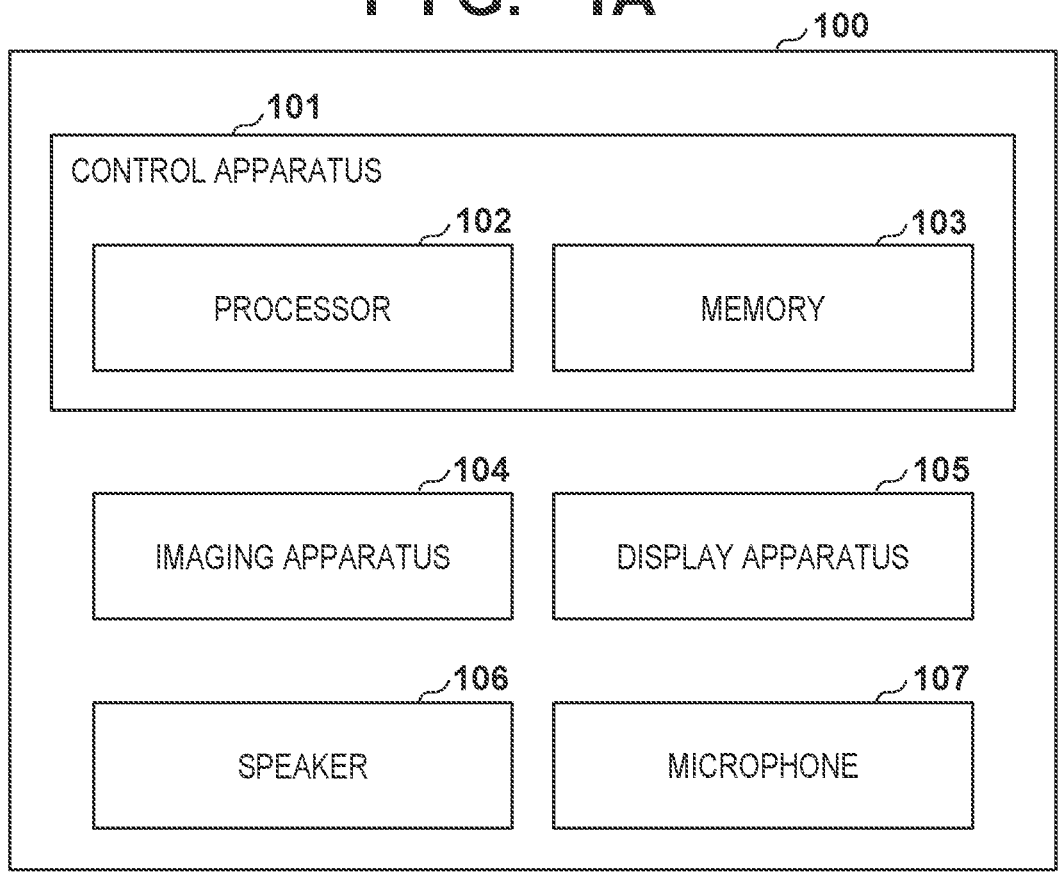
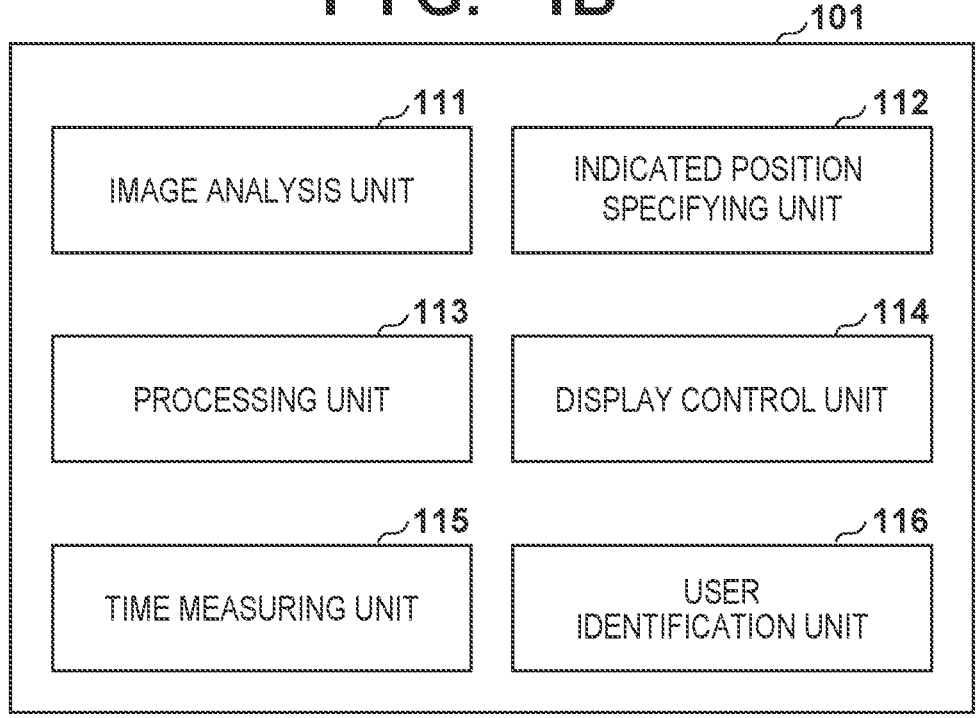

FIG. 6
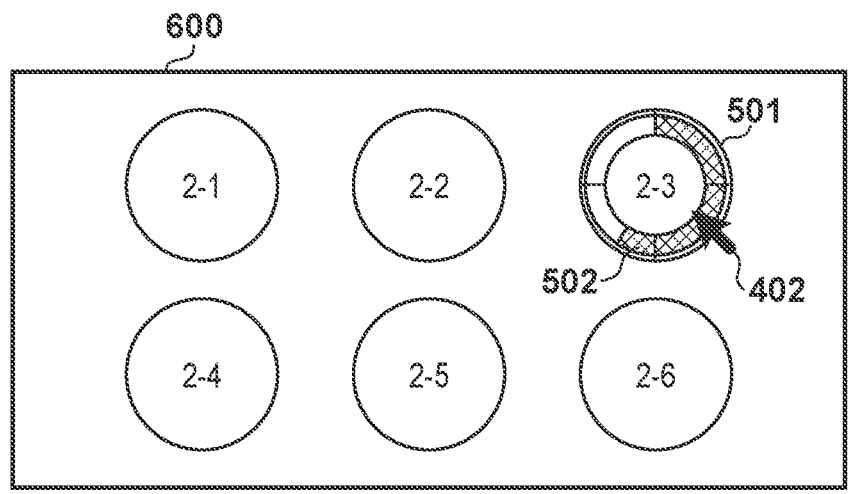
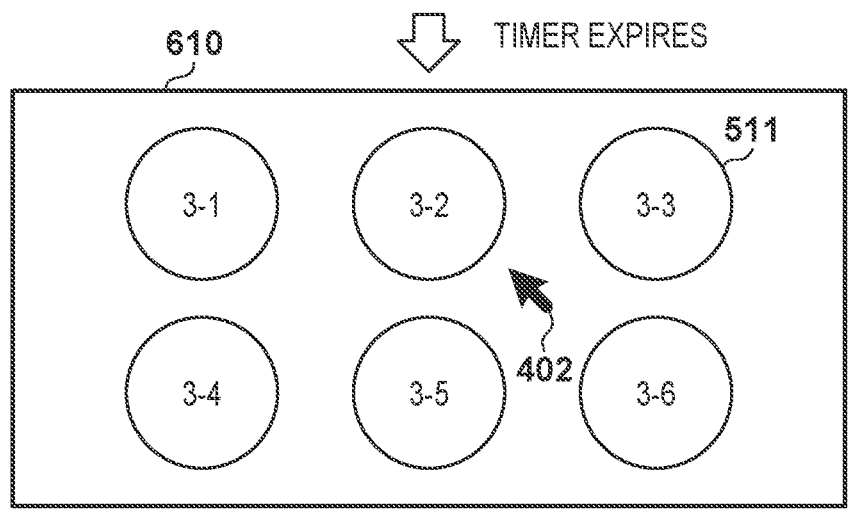

FIG. 7
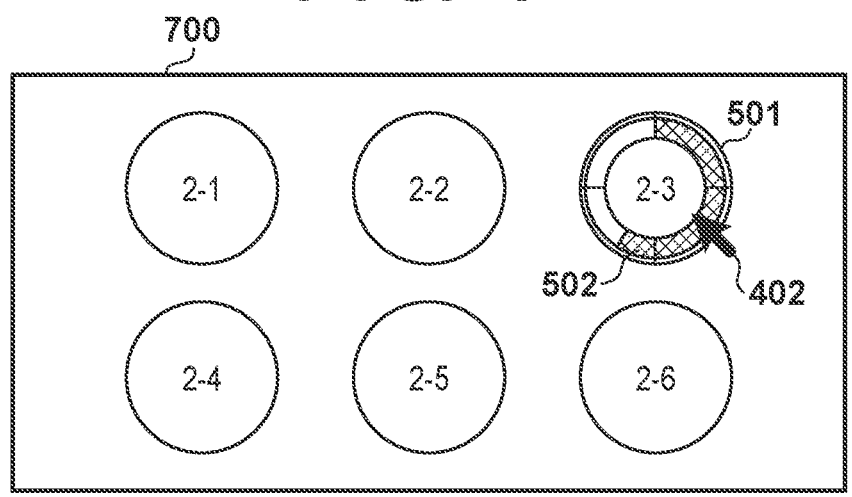
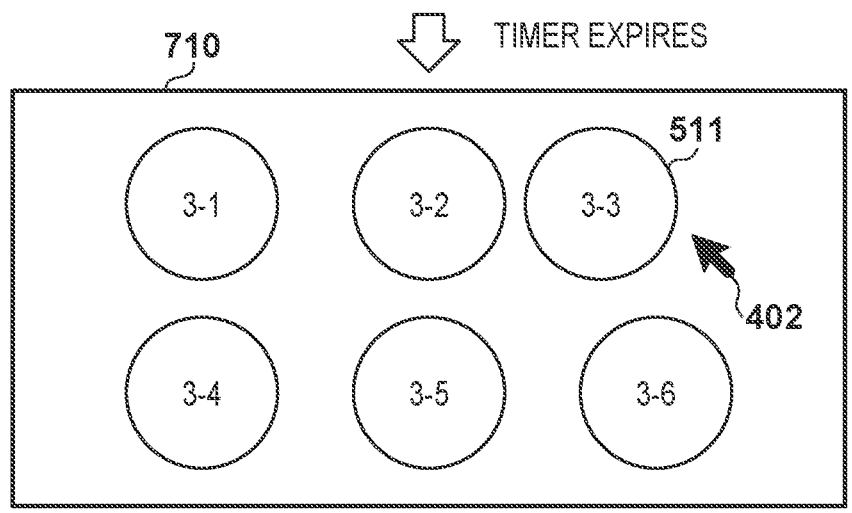

FIG. 8
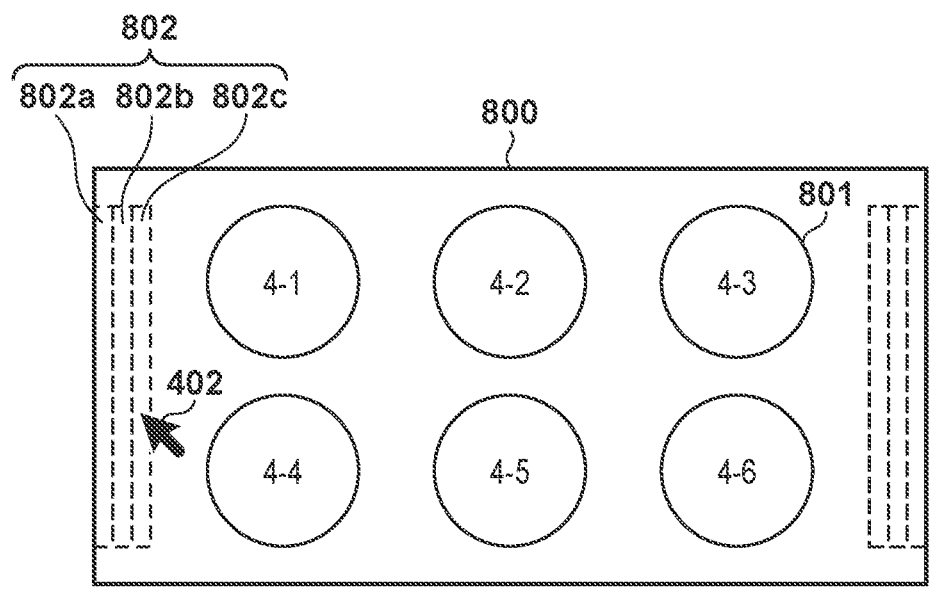
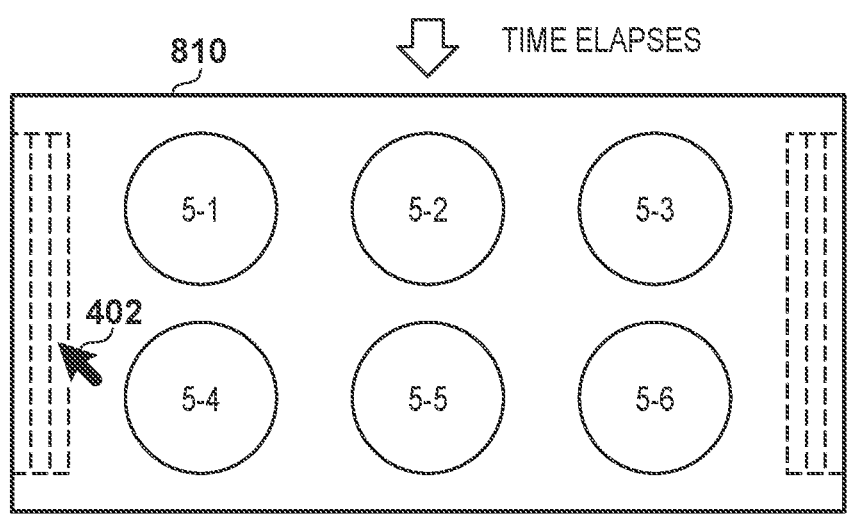

FIG. 9
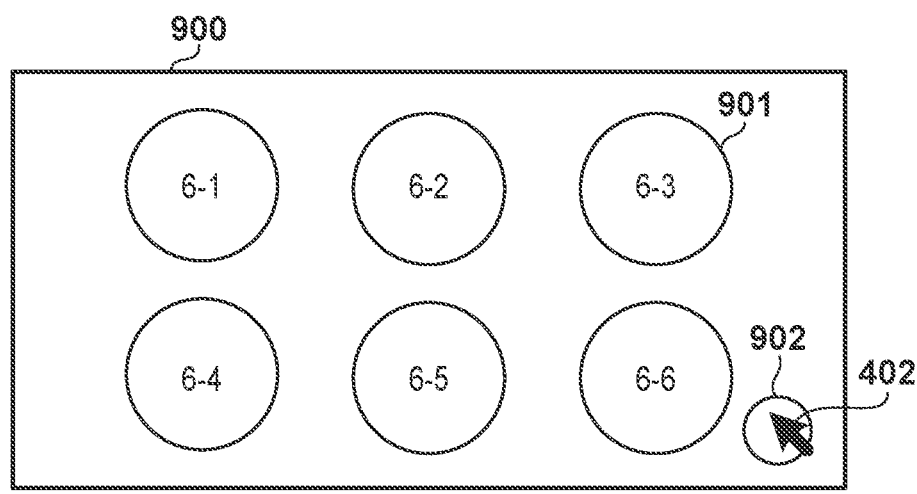
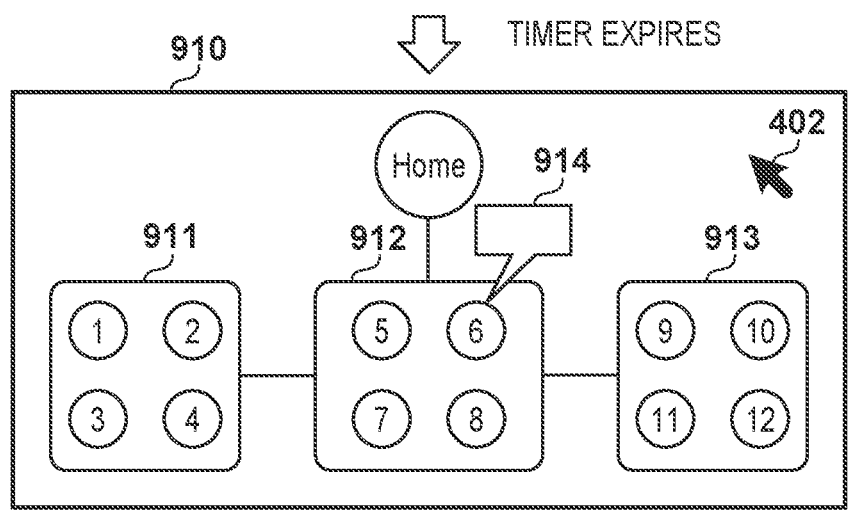

CONTROL APPARATUS ALLOWING A USER TO INPUT OPERATIONS

CROSS-REFERENCE TO RELATED APPLICATION(S)

This application claims priority to and the benefit of Japanese Patent Application No. 2022-018816 filed on Feb. 9, 2022, the entire disclosure of which is incorporated herein by reference.

BACKGROUND OF THE INVENTION

Field of the Invention

The present invention relates to a control apparatus.

Description of the Related Art

Various techniques have been proposed for receiving input from a user in a vehicle. Japanese Patent Laid-Open No. 2018-132824 proposes a technique for a user of a vehicle to perform input to an in-vehicle device by non-contact gestures (so-called, aerial gesture). In order to perform input by operations such as specific shapes of a hand or specific movement patterns of a hand, a user of a control apparatus (hereinafter, referred to as "user") need to memorize these operations in advance. Therefore, the user may not be able to perform intuitive input operations.

SUMMARY OF THE INVENTION

An aspect of the present disclosure provides a technique that allows a user to perform intuitive input operations. According to an embodiment, a control apparatus for providing a user interface to a user is provided. The apparatus comprises a display control unit configured to display a selectable object on a display apparatus, a detection unit configured to analyze an image of a hand of the user to detect a position of the hand, a specifying unit configured to specify an indicated position in the display apparatus based on the position of the hand, and a processing unit configured to, based on the indicated position overlapping the selectable object, execute processing associated with the selectable object. The display control unit further displays, in the display apparatus, a cursor that indicates the indicated position.

BRIEF DESCRIPTION OF THE DRAWINGS

FIGS. 1A and 1B illustrate an example of a configuration of a vehicle and a control apparatus according to some embodiments;

FIG. 6 illustrates transitions of the display screen according to some embodiments;

FIG. 7 illustrates transitions of the display screen according to some embodiments;

FIG. 8 illustrates transitions of the display screen according to some embodiments;

FIG. 9 illustrates transitions of the display screen according to some embodiments.

DESCRIPTION OF THE EMBODIMENTS

Figure 2:
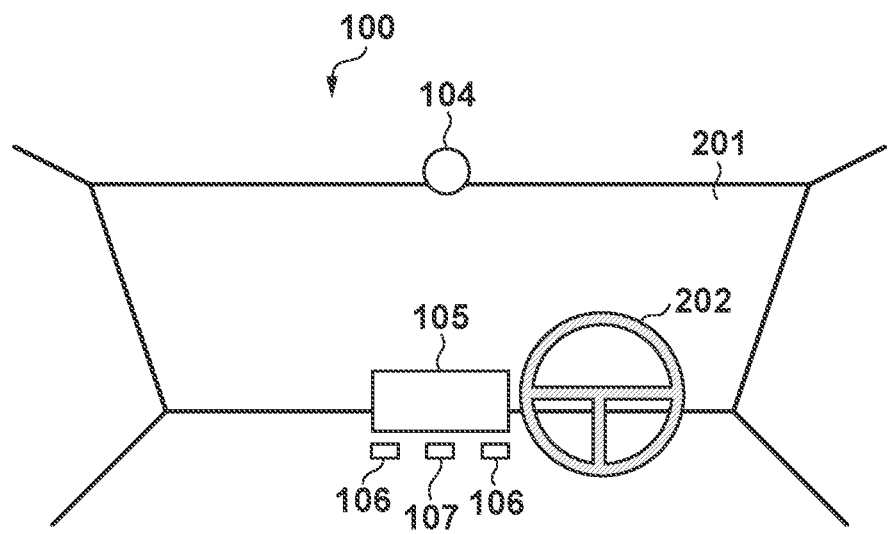
FIG. 2 illustrates an example of a vehicle layout according to some embodiments.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Some embodiments of the present disclosure relate to a control apparatus for providing a user interface to a user. The control apparatus can be an apparatus for controlling any type of device, such as power management apparatus (static device), vehicle, lawnmower, and airplane (dynamic device). Hereinafter, a vehicle is used as an example of device controlled by the control apparatus. The user of a vehicle may be a driver of the vehicle or a passenger. According to some embodiments of the present disclosure, the user can perform an input operation simply by moving a hand without contacting a specific apparatus. Also, since the position that the user is indicating on a display apparatus is indicated by a cursor, the user can intuitively recognize which position of the display apparatus he or she is indicating.

An example of a configuration of hardware mounted on a vehicle 100 and an example of a functional configuration of a control apparatus 101 will be described with reference to FIGS. 1A and 1B. In the following, description will be given focusing on the components to be used in describing the embodiments. Description of components that are used in implementing the vehicle 100 but are not used in describing the embodiments (e.g., a driving apparatus such as an engine and a motor, a braking apparatus such as a brake, and the like) will be omitted.

The vehicle 100 includes the control apparatus 101, an imaging apparatus 104, a display apparatus 105, a speaker 106, and a microphone 107. The control apparatus 101 provides a user interface to a user of the vehicle 100 by controlling the imaging apparatus 104, the display apparatus 105, the speaker 106, and the microphone 107. Hereinafter, the user of the vehicle 100 will simply be referred to as the user. The control apparatus 101 may be, for example, an Electronic Control Unit (ECU). The control apparatus 101 may be implemented by a single apparatus or a plurality of apparatuses capable of communicating with each other. The control apparatus 101 includes a processor 102 and a memory 103. The memory 103 stores programs and data used to perform processing of the control apparatus 101. The memory 103 may store temporary data when the control apparatus 101 is performing processing. The processor 102 executes programs stored in the memory 103 to perform operation of the control apparatus 101. The processor 102 may be a single processor or a plurality of processors. The memory 103 may be a single memory or a plurality of memories.

The imaging apparatus 104 captures images of the user (in particular, images of the user's hand). The imaging apparatus 104 may be a visible light camera for capturing images of the user using visible light. The imaging apparatus 104 may also be a near-infrared camera for capturing images of the user using near-infrared rays. Furthermore, the imaging apparatus 104 may be a Time of Flight (ToF) camera for capturing images of the user using laser. The imaging apparatus 104 may be any other type of sensor for capturing images of the user. The vehicle 100 may have only one type of imaging apparatus 104 or may have a plurality of types of imaging apparatuses 104. The vehicle 100 may have only one or a plurality of imaging apparatuses 104 of each type.

The display apparatus 105 is an apparatus for providing visual information to the user. For example, the display apparatus 105 may be a dot-matrix display, segment display, indicators, or any other display apparatus. The vehicle 100 may have only one or a plurality of display apparatuses 105.

The speaker 106 is an apparatus for providing auditory information to the user. The vehicle 100 may have only one or a plurality of speakers 106. The microphone 107 is an apparatus for receiving voice input from the user. The vehicle 100 may have only one or a plurality of microphones 107. The vehicle 100 may include input apparatuses other than the above such as a physical button, a touch panel, and a lever, for example.

An example of positions to attach the hardware elements described in FIG. 1A will be described with reference to FIG. 2. FIG. 2 is a diagram seeing forward (a direction toward a windshield 201) from the center of a vehicle cabin of the vehicle 100. The vehicle 100 is a so-called right-handle vehicle having a steering wheel 202 on the right side when facing a traveling direction. The present disclosure can be similarly applied to left-handle vehicles.

The imaging apparatus 104 is mounted, for example, near the center at the top of the windshield 201. For example, the imaging apparatus 104 may be mounted to a rear-view mirror (not shown) of the vehicle 100. The imaging apparatus 104 is attached to a position from which both a hand of the user seated in the driver's seat (i.e., the driver) and a hand of the user seated in the passenger seat (i.e., a passenger) can be captured. The control apparatus 101 can recognize whether a hand in the image captured by the imaging apparatus 104 is the right hand or the left hand. A range in which the user's hand can be captured may be a range in which it is thought that the user would move his or her hand in front of his or her body while he or she is seated. The vehicle 100 may have one imaging apparatus 104 in front of the driver's seat and another imaging apparatus 104 in front of the passenger seat.

The display apparatus 105 is mounted, for example, near the center at the bottom of the windshield 201. For example, the display apparatus 105 may be attached to instrument panel (not shown) of the vehicle 100. The display apparatus 105 may be located in front of the user. In the example of FIG. 2, the vehicle 100 has only one display apparatus 105. Alternatively, the vehicle 100 may have another display apparatus 105 in front of the passenger seat in addition to the display apparatus 105 mounted near the center at the bottom of the windshield 201. The display apparatus 105 may be an apparatus having a display surface thereon, such as a liquid crystal display or an organic electro-luminescence (EL) display, or an apparatus for projecting images on objects outside the apparatus, such as a head-up display. The display apparatus 105 may be a device for generating a three-dimensional (3D) image, hologram, virtual reality (VR) image, or augmented reality (AR) image.

The vehicle 100 has a pair of speakers 106 on the left and right below the display apparatus 105, and the microphone 107 between these speakers 106 in the example shown in FIG. 2, but the arrangements of these devices are not limited to these positions.

Description will be given for the functions of the control apparatus 101 with reference to FIG. 1B. The control apparatus 101 has functional units illustrated in FIG. 1B. These functional units may be implemented by the processor 102 executing programs stored in the memory 103. Alternatively, some or all of these functional units may be implemented by a dedicated integrated circuit such as an Application Specific Integrated Circuit (ASIC) or a Field Programmable Gate Array (FPGA).

An image analysis unit 111 acquires an image of the user captured by the imaging apparatus 104 and analyzes this image. The image of the user captured by the imaging apparatus 104 will be referred to as the user image. The user image includes the user, in particular, the user's hand. The image analysis unit 111 detects the position of the user's hand and the shape of the hand by analyzing the user image.

Figure 3:
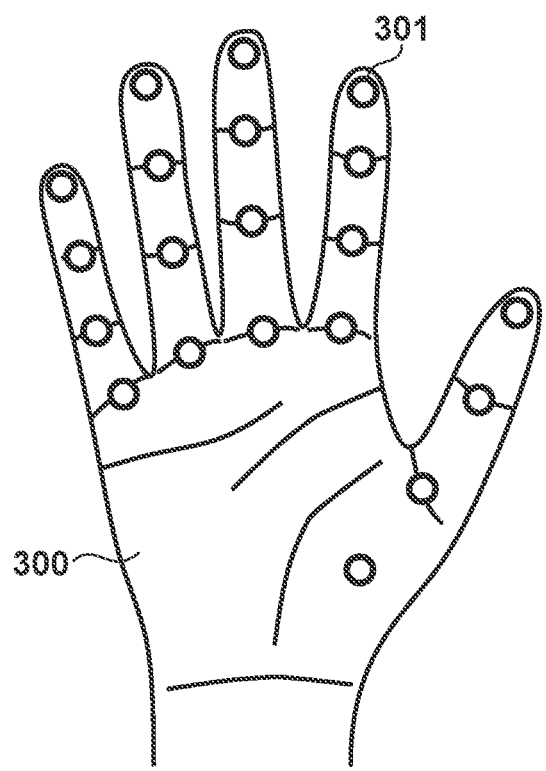
FIG. 3 illustrates an example of feature points on a hand according to some embodiments.

A specific example of a method of analyzing the user image will be described with reference to FIG. 3. FIG. 3 shows a hand 300 included in the user image. The image analysis unit 111 detects the position and shape of the hand 300 based on the positions of a plurality of feature points included in the hand 300. In the example of FIG. 3, 20 feature points of the hand 300 are set. In FIG. 3, each of the plurality of feature points is indicated by a circle, one of which is set as a feature point 301 (the fingertip of the index finger). For each of the index finger, middle finger, ring finger, and pinky finger, the fingertip, first joint, second joint, and the base are set as feature points. For the thumb, the fingertip, first joint, and the base are set as feature points. In addition, the center of the ball of the thumb of the hand 300 is set as a feature point.

The image analysis unit 111 detects the position of the hand 300 based on the central position of the plurality of feature points of the hand 300. For example, the image analysis unit 111 may specify the two-dimensional coordinate values of each of the plurality of feature points in the user image and then specify, as the two-dimensional coordinate values of the hand 300, a simple average of the two-dimensional coordinate values of the plurality of feature points. When the user image is a two-dimensional image, the coordinate values of the two-dimensional image become the two-dimensional coordinate values of a feature point. When the user image is a three-dimensional image, the coordinate values of a specific plane (e.g., a plane perpendicular to a vehicle length direction) of the three-dimensional image become the two-dimensional coordinate values of a feature point. When there is a feature point that cannot be recognized from the user image, the image analysis unit 111 may detect the position of the hand 300 without considering the feature point that cannot be recognized. Alternatively, the image analysis unit 111 may estimate the position of a feature point that cannot be recognized based on a feature point that can be recognized and detect the position of the hand 300 based on this estimated position and the position of the recognized feature point. By detecting the position of the hand based on the plurality of feature points in this manner, the position of the hand can be detected with high accuracy.

The image analysis unit 111 may detect the shape of the hand 300 based on the positional relationship between the plurality of feature points. For example, the image analysis unit 111 detects that the index finger and the middle finger are separated if the distance between the finger tip of the index finger and the fingertip of the middle finger is larger than the distance between the base of the index finger and the base of the middle finger. The image analysis unit 111 detects that the index finger and the middle finger are touching if the distance between the finger tip of the index finger and the fingertip of the middle finger is similar to the distance between the base of the index finger and the base of the middle finger. The shape of the hand 300 may be detected using a model obtained by supervised learning in which the two-dimensional coordinate values of the plurality of feature points are taken as input and an actual hand shape is generated as output.

Referring again to FIG. 1B, an indicated position specifying unit 112, based on the position of the user's hand, specifies the position that the user is indicating on the display apparatus 105. The position that the user is indicating will be referred to as the indicated position. For example, the indicated position specifying unit 112 may store a mapping between the two-dimensional coordinate values of the position of the hand in the user image and the two-dimensional coordinate values of the screen of the display apparatus 105. According to this mapping, the indicated position specifying unit 112 associates the position of the hand 300 having specific two-dimensional coordinate values in the image with specific two-dimensional coordinate values of the screen of the display apparatus 105, and specifies that two-dimensional coordinate values as the indicated position.

The indicated position specifying unit 112 may align the position of the user's hand with the center of the screen of the display apparatus 105. For example, the indicated position specifying unit 112 may request the user to move his or her hand to a position that indicates the center of the screen of the display apparatus 105 using the display apparatus 105 or the speaker 106. After the user's hand has become stationary, the indicated position specifying unit 112 detects the position of the user's hand and associates the position of this hand with the center of the screen of the display apparatus 105.

The indicated position specifying unit 112 moves the indicated position in the display apparatus 105 based on the movement of the position of the user's hand. For example, when the user moves his or her hand upward seen from where he or she is, the indicated position specifying unit 112 moves the indicated position upward accordingly. When the user moves his or her hand to the right seen from where he or she is, the indicated position specifying unit 112 moves the indicated position to the right accordingly. The relationship between the distance of movement of the hand and the distance of movement of the indicated position may be determined in advance and stored in the memory 103. For example, when the hand is moved 50 mm, the indicated position specifying unit 112 may move the indicated position by an amount that is shorter (e.g., 30 mm) or longer (e.g., 100 mm) than or the same as 50 mm. When the indicated position moves out of the screen of the display apparatus 105 as a result of the user moving the hand, the indicated position specifying unit 112 may specify that the user is not indicating the display apparatus 105. The ratio of the distance of movement of the indicated position to the distance of movement of the hand is stored in, for example, the memory 103. The user may be allowed to change this ratio.

A processing unit 113 executes various processes according to input from the user. These processes may be of any kind and may include, for example, screen transitions, music playback, video playback, route guidance, browsing, gameplay, and the like. A display control unit 114 controls the display content of the display apparatus 105. Specific examples of the operation of the display control unit 114 will be described later. A time measuring unit 115 measures various times during operation of the control apparatus 101. A user identification unit 116 identifies the user who is using a user interface provided by the control apparatus 101. The control apparatus 101 may provide individual user interfaces for individual users identified.

An example of control of the display content of the display apparatus 105 by the control apparatus 101 will be described with reference to FIG. 4. The control apparatus 101 (specifically, the display control unit 114) displays a screen 400 on the display apparatus 105. The screen 400 includes a plurality of icons (in the example of FIG. 4, six icons labeled "1-1" to "1-6"). An icon is an example of an object (also referred to as a selectable object) that can be selected by the user. The selectable object need not be an icon. For example, the selectable object may be an image or a character string that is a link. In the following, icons will be used as examples of selectable objects, but techniques to be described below can be applied to selectable objects other than icons. Selectable objects may be associated with particular processes (e.g., screen transition, music playback start, video playback start, volume increase, and the like).

The control apparatus 101 identifies the indicated position in the display apparatus 105 based on the position of the user's hand and displays, in the screen 400 of the display apparatus 105, a cursor 402 indicating this indicated position. In the example of FIG. 4, the cursor 402 has the shape of an arrow, and the tip of the arrow indicates the indicated position. The shape of the cursor 402 is not limited to an arrow and may be any other shape or representation. For example, the cursor 402 may be circular or star-shaped.

Assume that the indicated position is moved along a dotted line 403 by the user moving his or her hand. In this case, the control apparatus 101 also moves the cursor 402 along the dotted line 403. When the indicated position overlaps a particular icon 401, it is thought that the user is requesting for processing associated with the icon 401. Therefore, the control apparatus 101 (specifically, its processing unit 113) may execute processing associated with the icon 401 based on the indicated position overlapping the icon 401. As described above, the user can instruct to execute the processing associated with the icon 401 simply by moving his or her hand and causing the cursor 402 to overlap the icon 401. Thus, the user can perform intuitive input operations.

The control apparatus 101 may immediately start processing when the indicated position overlaps the icon 401. However, when input operations are made by aerial gestures as in the embodiments of the present disclosure, the user may move his or her hand unintentionally such that the indicated position ends up overlapping the icon 401. Therefore, in some embodiments, the control apparatus 101 (specifically, its time measuring unit 115) measures the duration of the state in which the indicated position overlaps the icon 401. Then, the control apparatus 101 (specifically, its processing unit 113) executes the processing associated with the icon 401 when the duration reaches a threshold time (e.g., 3 seconds). Meanwhile, the control apparatus 101 (specifically, its processing unit 113) does not execute the processing associated with the icon 401 when the duration does not reach the threshold time (e.g., when the indicated position moves out from the icon 401 before that). This makes it possible to prevent processing that the user did not intend from being performed. The duration reaching the threshold time may be reworded as the timer set to the threshold time expiring. The threshold time is stored, for example, in the memory 103. The user may be allowed to change the threshold time. The same applies to other threshold times described below.

The control apparatus 101 starts measuring time in response to the indicated position overlapping the icon 401. With that, the control apparatus 101 switches the display of the screen 400 to the display of a screen 410, which includes a timer indicator 411. Displaying the timer indicator 411 in this manner makes it easier for the user to recognize that the indicated position is overlapping the icon 401. Therefore, if such a movement of the indicated position was not intended by the user, it is considered that the user would move his or her hand.

The control apparatus 101 changes the appearance of the timer indicator 411 in accordance with the duration of the state in which the indicated position overlaps the icon 401. For example, as illustrated on a screen 420, the control apparatus 101 may shorten the hatched portion of the timer indicator 411 as time elapses. This makes it possible for the user to recognize that processing will be executed after a timer is expired.

Figure 4:
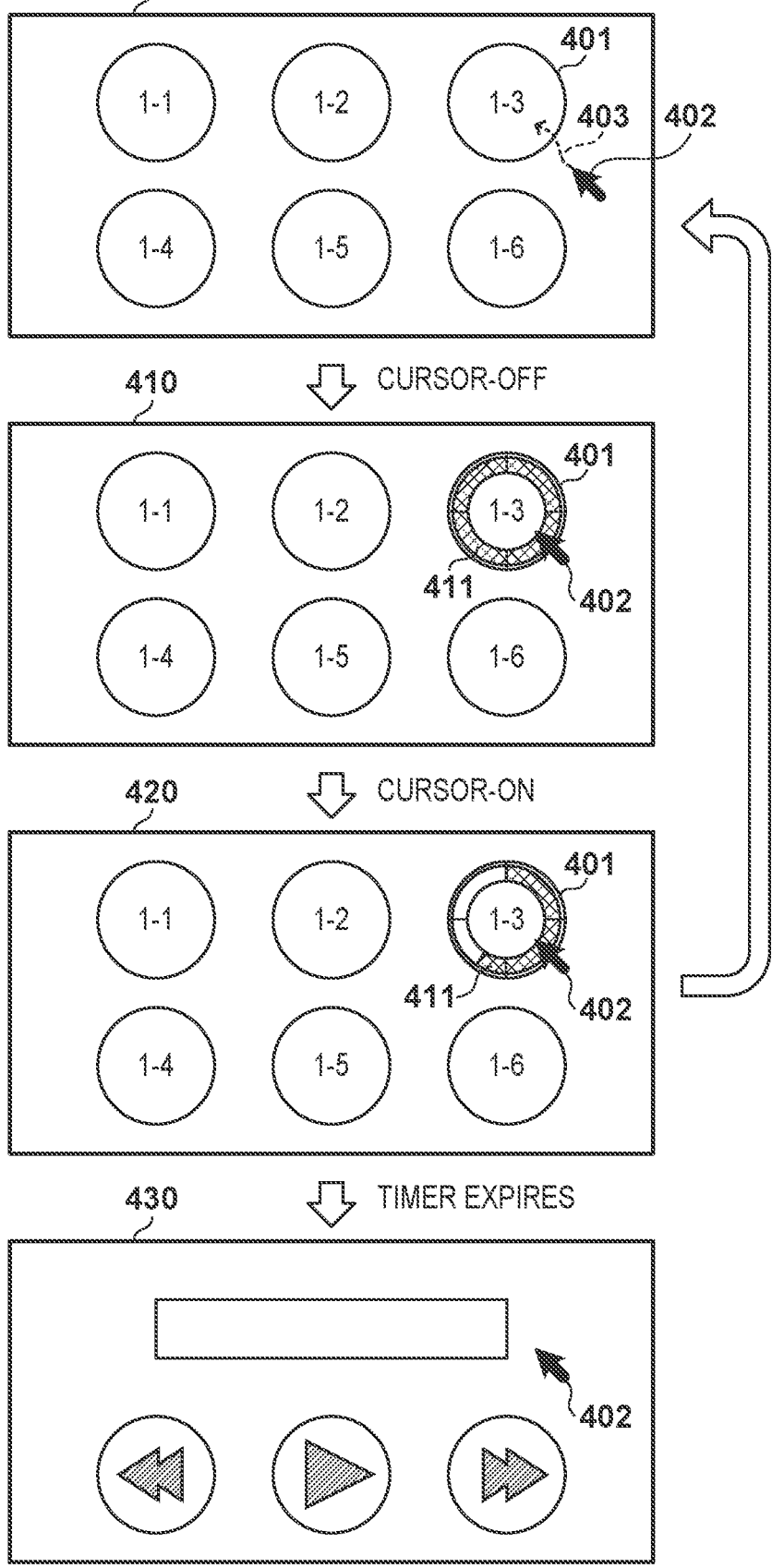
FIG. 4 illustrates transitions of a display screen according to some embodiments.

In the example of FIG. 4, the timer indicator 411 is displayed (e.g., overlapping the icon 401) in association with the icon 401 that the indicated position is overlapping. Alternatively, the timer indicator 411 may be displayed at a position independent of the icon 401 that the indicated position is overlapping (e.g., at a predetermined position, such as on the top right of the screen). The timer indicator 411 may also indicate the time that has elapsed from when the indicated position overlapped the icon 401 or the time remaining until the processing associated with the icon 401 is started. The timer indicator 411 may also be an illustration, text, or symbol.

If the pointing position moves outside the icon 401 before the duration of the state in which the pointing position overlaps the icon 401 reaches the threshold time, the control apparatus 101 does not perform the processing associated with the icon 401 and returns the icon 401 to a normal display, such as in the screen 400. If the duration of the state in which the indicated position overlaps the icon 401 reaches a threshold time, the control apparatus 101 performs the processing associated with the icon 401. In response to the execution of this processing, the control apparatus 101 may switch the display of the screen 420 to the display of a screen 430, which is specific to the processing. The control apparatus 101 may adopt a timer until the start of execution as described above for all selectable objects that are displayed, or may adopt a timer only for some selectable objects.

Figure 5:
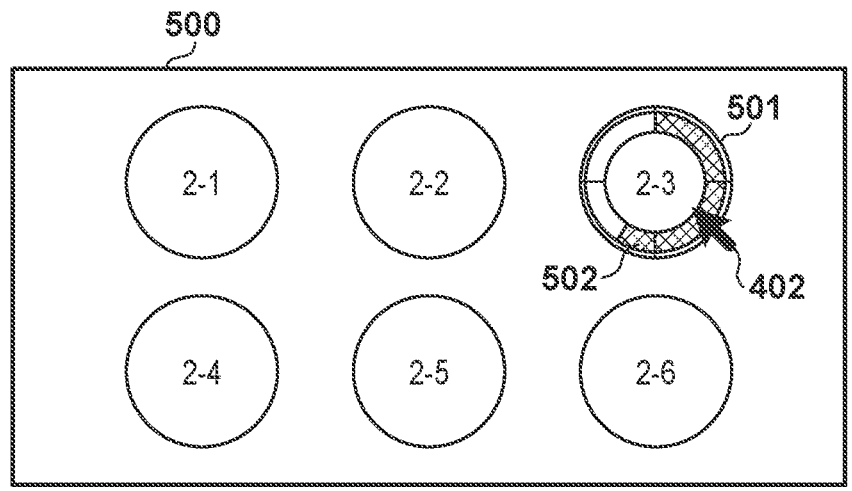
FIG. 5 illustrates transitions of the display screen according to some embodiments.

Another example of control of the display content of the display apparatus 105 by the control apparatus 101 will be described with reference to FIG. 5. The control apparatus 101 displays a screen 500 on the display apparatus 105. The screen 500 includes a plurality of icons (in the example of FIG. 5, six icons labeled "2-1" to "2-6"). In addition, the screen 500 includes the cursor 402, which indicates the position indicated by the user. Since the indicated position overlaps an icon 501, a timer indicator 502 is also displayed.

If the duration of the state in which the indicated position overlaps the icon 501 reaches the threshold time, the control apparatus 101 performs the processing associated with the icon 501. Assume that this processing includes switching the display of the screen 500 to the display of a screen 510. The screen 510 includes a plurality of icons (in the example of FIG. 5, six icons labeled "3-1" to "3-6"). If no change is made to the indicated position by the user in the transition from the screen 500 to the screen 510, the control apparatus 101 continues to display the cursor 402 at the same position of the display apparatus 105.

Assume that the screen 510 after the transition includes an icon 511 at a position that overlaps the indicated position. In this case, although the pointing position overlaps the icon 511, the user may not intend to select the icon 511. Therefore, when the indicated position at the start of display of the screen 510 overlaps the icon 511, the control apparatus 101 deems that the indicated position does not overlap the icon 511 until a predetermined condition is met. Therefore, the control apparatus 101 neither starts measuring elapsed time nor displays a timer indicator. This makes it possible to prevent processing that the user did not intend from being performed.

The above predetermined condition may be that the duration of the state in which the indicated position overlaps the icon 511 has reached the threshold time (e.g., 5 seconds). If the user has not moved his or her hand for a certain amount of time as described above, it is considered that the user is trying to select the icon 511. Alternatively or additionally, the above predetermined condition may be that the indicated position has moved to the outside of the icon 511 and then overlapped the icon 511 again. If the user has intentionally changed the indicated position as described above, it is considered that the user is trying to select the icon 511.

When such a predetermined condition as described above is met, the control apparatus 101 deems that the indicated position is overlapping the icon 511, starts measuring elapsed time, and displays a timer indicator 521 as in a screen 520.

Another example of control for when the indicated position overlaps an icon of a screen after the transition will be described with reference to FIG. 6. A screen 600 is the same as the screen 500. Assume that the timer for starting the processing associated with the icon 501 has expired in a state in which the indicated position overlaps the icon 501. In this case, the control apparatus 101 displays a screen 610, which includes a plurality of icons (in the example of FIG. 5, six icons labeled "3-1" to "3-6").

Since the indicated position at the start of display of the screen 610 overlaps with the icon 511, the control apparatus 101 deems that the indicated position has moved to a position at which it does not overlap any of the icons of the screen 610 regardless of the movement of the user's hand, and the cursor 402 also moves so as to indicate the indicated position after that movement. This makes it possible to prevent processing that the user did not intend from being performed. In this case, since the actual position of the user's hand and the indicated position will be shifted, the control apparatus 101 also shifts the mapping between the position of the hand in the image captured by the imaging apparatus 104 and the indicated position in the display apparatus 105.

Another example of control for when the indicated position overlaps an icon of a screen after the transition will be described with reference to FIG. 7. A screen 700 is the same as the screen 500. Assume that the timer for starting the processing associated with the icon 501 has expired in a state in which the indicated position overlaps the icon 501. In this case, the control apparatus 101 displays a screen 710, which includes a plurality of icons (in the example of FIG. 5, six icons labeled "3-1" to "3-6").

Assume that the indicated position at the start of display of the screen 710 overlaps the position at which the icon 511 is originally displayed. In this case, as illustrated in the screen 710, the control apparatus 101 displays the icon 511 at a position in the screen 710 that does not overlap the indicated position. As a result, the indicated position does not overlap with any icon. This makes it possible to prevent processing that the user did not intend from being performed. In the example of FIG. 7, the control apparatus 101 displays only the icon 511 in another position but may also perform a rearrangement that includes other icons.

Another example of control of the display content of the display apparatus 105 by the control apparatus 101 will be described with reference to FIG. 8. The control apparatus 101 displays a screen 800 on the display apparatus 105. The screen 800 includes a plurality of icons (in the example of FIG. 8, six icons labeled "4-1" to "4-6"). In addition, the screen 800 includes the cursor 402, which indicates the position indicated by the user. Further, in the screen 800, the position indicated by a dotted line, a switching region 802 for switching the current screen to another screen is also set. In the example of FIG. 8, the switching region 802 is set on both left and right sides of the screen 800. Alternatively or additionally, the switching region 802 may be set on the upper or lower side of the screen 800. The control apparatus 101 may also display the screen 800 so that the user can recognize that the switching region 802 is present.

When the duration of the state in which the indicated position overlaps the switching region 802 reaches the threshold time, the control apparatus 101 switches the display of the current screen 800 to the display of a screen (e.g., screen 810) associated with the switching region 802. Such switching of the screen by the switching region 802 may be utilized for scrolling the screen, for example. Similarly to the case where the indicated position overlaps an icon 801, the control apparatus 101 may display a timer indicator indicating the duration of the state in which the indicated position overlaps the switching region 802.

The switching region 802 may be divided into a plurality of switching regions 802a to 802c. The switching region 802c is the farthest from the edge of the screen 800, the switching region 802b is closer to the edge of the screen 800 than the switching region 802c, and the switching region 802a is closest to the edge of the screen 800. The control apparatus 101 may individually set a threshold time for switching the screen for each of the plurality of switching regions 802a to 802c. For example, the control apparatus 101 may shorten the threshold time the closer the region is to the edge of the screen 800. For example, the threshold time for the switching region 802a may be 0.5 seconds, the threshold time for the switching region 802b may be 1 second, and the threshold time for the switching region 802c may be 3 seconds. The farther the switching region is from the edge of the screen, the more likely the user may indicate it unintentionally. Therefore, the control apparatus 101 sets a longer threshold time the farther the switching region is from the edge of the screen. This makes it possible to prevent the switching of the screen that the user did not intend from being performed.

Another example of control of the display content of the display apparatus 105 by the control apparatus 101 will be described with reference to FIG. 9. The control apparatus 101 displays a screen 900 on the display apparatus 105. The screen 900 includes a plurality of icons (in the example of FIG. 9, six icons labeled "6-1" to "6-6"). In addition, the screen 900 includes the cursor 402, which indicates the position indicated by the user. The screen 900 also includes an icon 902 for indicating that an overview screen 910 is to be displayed. Similarly to the above examples, the control apparatus 101 may transition the screen by the timer expiring. The icon 902 for indicating to display the overview screen 910 may be included only in some of the screens displayed on the display apparatus 105 or in all of the screens displayed on the display apparatus 105.

By selecting the icon 902, the control apparatus 101 switches the display of the screen 900 to the display of the overview screen 910. In the overview screen 910, a plurality of functions that can be executed by the user are indicated by icons (labeled "1" to "12" in FIG. 9). Each of the plurality of regions 911 to 913 of the overview screen 910 displays closely-related functions in a cluster. The overview screen 910 includes an indicator 914 indicating an icon of the functions associated with the screen 900 before the transition.

Figure 10:
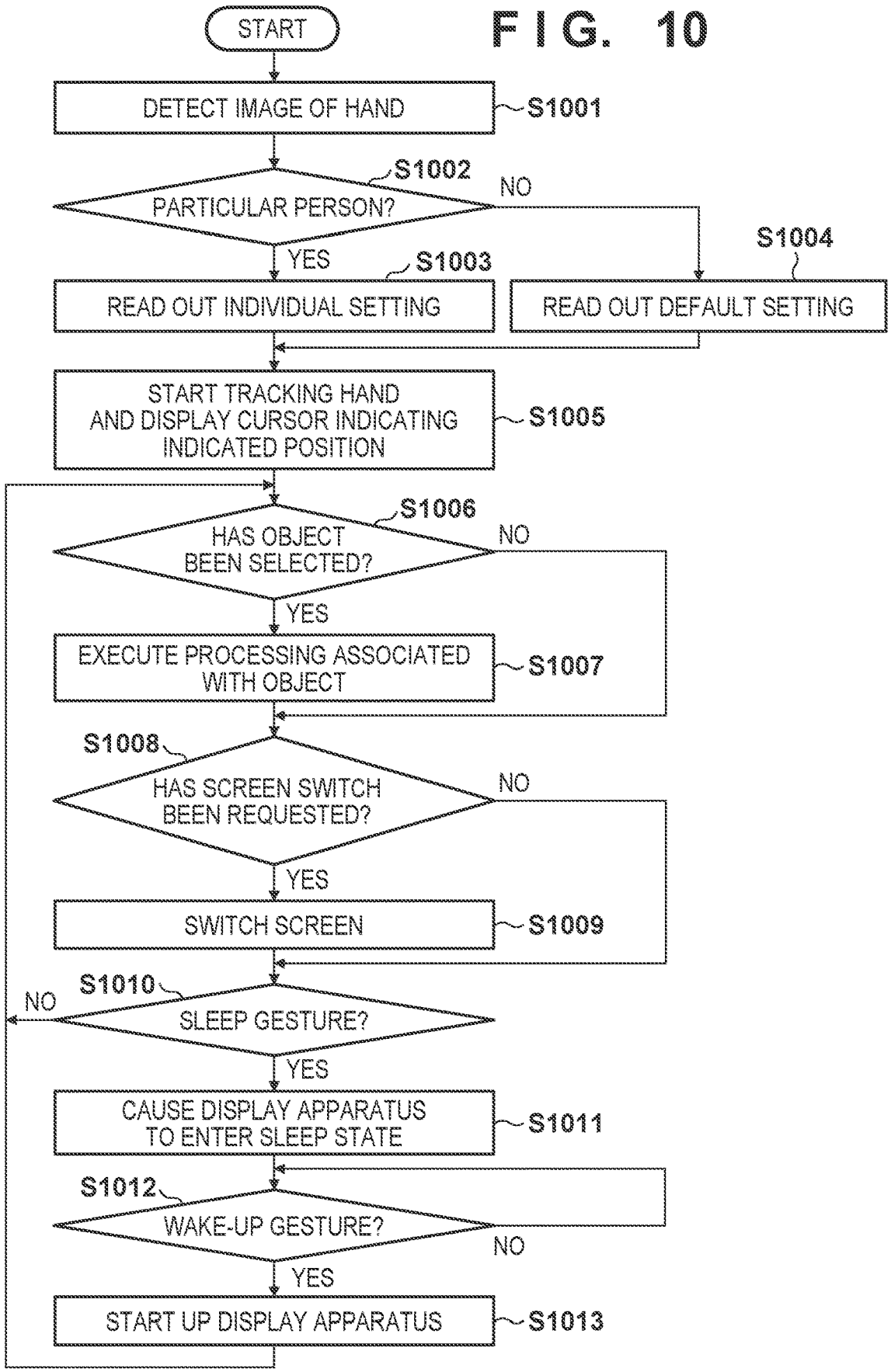
FIG. 10 illustrates an example of operation of the control apparatus according to some embodiments.

Description will be given for an example of operation of the control apparatus 101 with reference to FIG. 10. Each step of the method to be described in FIG. 10 may be performed by the processor 102 executing programs stored in the memory 103, for example. The method of FIG. 10 may be started in response to the power of the vehicle 100 turning on or may be started in response to an explicit instruction from a user. In the following, redundant description will not be repeated for the content that has been described in detail in the above.

In step S1001, the control apparatus 101 (for example, its image analysis unit 111) detects the user's hand by analyzing the user image. To perform this detection, the control apparatus 101 may request the user to move his or her hand to a position indicating the center of the screen of the display apparatus 105. At this time, the control apparatus 101 may align the position of the user's hand with the center of the screen of the display apparatus 105.

In step S1002, the control apparatus 101 (for example, its user identification unit 116) determines whether the user is a particular person based on the detected image of his or her hand. A particular person may be a person who has used a user interface provided by the control apparatus 101 in the past. To make such a determination, the control apparatus 101 may store a usage history in the memory 103 for each individual user. The usage history may include, for example, the usage frequency of each function, the setting of the ratio of the distance of movement of the indicated position to the distance of movement of the hand, the setting of the length of the threshold time for executing the processing, and the like.

When it is determined that the person is a particular person in step S1002 ("YES" in step S1002), the control apparatus 101 transitions the process to step S1003 and, otherwise ("NO" in step S1002), transitions the process to step S1004.

In step S1003, the control apparatus 101 reads out a setting that is unique to the identified person and controls the display of a subsequent screen in accordance with this setting. For example, the control apparatus 101 may preferentially display functions that are frequently used by the identified person. In step S1004, the control apparatus 101 reads out a default setting and controls the display of a subsequent screen in accordance with this setting.

In step S1005, the control apparatus 101 begins to track the position of the user's hand. Thereafter, the control apparatus 101 continuously detects the position of the user's hand. Further, the control apparatus 101 displays a start screen (or a home screen) on the display apparatus 105 and displays, in the display apparatus 105, a cursor indicating the position indicated by the user.

In step S1006, the control apparatus 101 determines whether or not a selectable object (e.g., icon) has been selected by the user. As described above, this determination may be made based on whether the duration of the state in which the indicated position overlaps the selectable object has reached the threshold time.

When it is determined that the selectable object has been selected in step S1006 ("YES" in step S1006), the control apparatus 101 transitions the process to step S1007 and, otherwise ("NO" in step S1006), transitions the process to step S1008. In step S1007, the control apparatus 101 performs the processing associated with the selectable object.

In step S1008, the control apparatus 101 determines whether a screen switch has been requested by the user. As described above, this determination may be made based on whether the duration of the state in which the indicated position overlaps a switching region has reached the threshold time.

When it is determined that a screen switch has been requested in step S1008 ("YES" in step S1008), the control apparatus 101 transitions the process to step S1009 and, otherwise ("NO" in step S1008), transitions the process to step S1010. In step S1008, the control apparatus 101 switches the screen as requested.

In step S1010, the control apparatus 101 determines whether the user has performed a sleep gesture. The sleep gesture is a gesture performed by the user to cause the display apparatus 105 to enter a sleep state and is determined in advance. For example, the sleep gesture may be a gesture in which an open hand is shaken side to side.

When it is determined that the user has performed the sleep gesture in step S1010 ("YES" in step S1010), the control apparatus 101 transitions the process to step S1011 and, otherwise ("NO" in step S1010), transitions the process to step S1006. In step S1011, the control apparatus 101 causes the display apparatus 105 to enter the sleep state.

In step S1012, the control apparatus 101 determines whether the user has performed a wake-up gesture. The wake-up gesture is a gesture performed by the user to cause the display apparatus 105 to release the sleep state and is determined in advance. For example, the wake-up gesture may be a thumbs-up.

When it is determined that the user has performed the wake-up gesture in step S1012 ("YES" in step S1012), the control apparatus 101 transitions the process to step S1013 and, otherwise ("NO" in step S1012), repeats step S1012. In step S1013, the control apparatus 101 causes the display apparatus 105 to start up.

As described above, although the control apparatus 101 detects the wake-up gesture while the display apparatus 105 is in the sleep state, it does not perform the determination in steps S1006 and S1008. Therefore, by causing the display apparatus 105 to enter the sleep state, the user can prevent the processing that he or she did not intend from being performed.

SUMMARY OF EMBODIMENTS

<Item 1>
A control apparatus (101) for providing a user interface to a user, the apparatus comprising:
 a display control unit (114) configured to display a selectable object (such as 501) on a display apparatus (105);
 a detection unit (111) configured to analyze an image of a hand (300) of the user to detect a position of the hand;
 a specifying unit (112) configured to specify an indicated position in the display apparatus based on the position of the hand; and
 a processing unit (113) configured to, based on the indicated position overlapping the selectable object, execute processing associated with the selectable object, wherein
 the display control unit further displays, in the display apparatus, a cursor (402) that indicates the indicated position.

By the virtue of this aspect, the user can perform desired processing simply by moving his or her hand and overlapping the cursor over the icon. Thus, the user can perform intuitive input operations.

<Item 2>
The control apparatus according to item 1, wherein the detection unit detects the position of the hand based on a central position of a plurality of feature points (301) included in the hand.

By virtue of this aspect, since the position of the hand is detected based on the plurality of feature points, the position of the hand can be detected with high accuracy.

<Item 3>
The control apparatus according to item 1 or 2, further comprising: a measuring unit configured to measure a duration of a state in which the indicated position overlaps the selectable object (115), wherein
 in a case where the duration reaches a threshold time, the processing unit executes the processing associated with the selectable object, and
 in a case where the duration does not reach the threshold time, the processing unit does not execute the processing associated with the selectable object.

By the virtue of this aspect, since the processing is not executed until the threshold time has elapsed, it is possible to prevent processing that the user did not intend from being executed.

<Item 4>
The control apparatus according to any one of items 1 to 3, further comprising: a measuring unit configured to measure a duration of a state in which the indicated position overlaps the selectable object (115), wherein
 the display control unit changes an appearance of a screen that includes the selectable object in accordance with the duration.

By the virtue of this aspect, it becomes possible to recognize that the processing will be executed after a timer is expired.

<Item 5>
The control apparatus according to any one of items 1 to 4, wherein the processing associated with the selectable object includes switching a display of a first screen that includes the selectable object to a display of a second screen that includes a second selectable object (511), and
 the processing unit, in a case where the indicated position at a start of the display of the second screen overlaps the second selectable object, deems that the indicated position does not overlap the second selectable object until a predetermined condition is met.

By the virtue of this aspect, it becomes possible to prevent processing that the user did not intend from being performed.

<Item 6>
The control apparatus according to any one of items 1 to 4, wherein the processing associated with the selectable object includes switching a display of a first screen that includes the selectable object to a display of a second screen that includes a second selectable object, and
 the processing unit, in a case where the indicated position at a start of the display of the second screen overlaps the second selectable object, moves the indicated position to a position at which the indicated position does not overlap any selectable object in the second screen.

By the virtue of this aspect, it becomes possible to prevent processing that the user did not intend from being performed.

<Item 7>

The control apparatus according to any one of items 1 to 4, wherein the processing associated with the selectable object includes switching a display of a first screen that includes the selectable object to a display of a second screen that includes a second selectable object, and the processing unit, in a case where the indicated position at a start of the display of the second screen overlaps a position at which the second selectable object is displayed, displays the second selectable object at a position at which the second selectable object does not overlap the indicated position in the second screen.

By the virtue of this aspect, it becomes possible to prevent processing that the user did not intend from being performed.

<Item 8>

The control apparatus according to any one of items 1 to 7, wherein a first screen that includes the selectable object includes a first switching position (802b) and a second switching position (802a) that is closer to an edge of the first screen than the first switching position, in a case where a duration of a state in which the indicated position overlaps the first switching position reaches a second threshold time, the display control unit switches a display of the first screen to a display of a third screen, and in a case where the duration of the state in which the indicated position overlaps the second switching position reaches a third threshold time, the display control unit switches the display of the first screen to the display of the third screen, and the third threshold time is shorter than the second threshold time.

By the virtue of this aspect, it becomes possible to prevent the switching of the screen that the user did not intend from being performed.

<Item 9>

The control apparatus according to any one of items 1 to 8, wherein the display control unit displays, in the display apparatus, a first screen that includes the selectable object and a third selectable object (902), and processing associated with the third selectable object includes displaying, in the display apparatus, a fourth screen (910) that indicates a plurality of functions that the user can execute.

By the virtue of this aspect, it becomes easier for the user to recognize a plurality of functions.

<Item 10>

The control apparatus according to any one of items 1 to 9, further comprising an identification unit (116) configured to identify that the user is a particular person based on an image of the hand, wherein the display control unit controls a display of a screen in accordance with a setting specific to the particular person.

By the virtue of this aspect, since display control customized for each user is performed, convenience for the user improves.

<Item 11>

A program for causing a computer to function as each unit of the control apparatus according to any one of items 1 to 10.

By the virtue of this aspect, a program having the above effects is provided.

The invention is not limited to the above embodiments, and various modifications and changes may be made within the scope of the spirit of the invention.

What is claimed is:

1. A control apparatus for providing a user interface to a user, the apparatus comprising at least one processor circuit and a memory storing instructions, that when executed by the processor circuit, cause the processor circuit to at least:
   display a selectable object on a display apparatus;
   analyze an image of a hand of the user to detect a position of the hand;
   specify an indicated position in the display apparatus based on the position of the hand;
   display, in the display apparatus, a cursor that indicates the indicated position; and
   based on the indicated position overlapping the selectable object, execute processing associated with the selectable object, wherein
   the processing associated with the selectable object includes switching a display of a first screen that includes the selectable object to a display of a second screen that includes a second selectable object, and
   the instructions, that when executed by the processor circuit, further cause the processor circuit to, in a case where the indicated position at a start of the display of the second screen overlaps the second selectable object, deem that the indicated position does not overlap the second selectable object and cease to start a timer to execute processing associated with the second selectable object until a predetermined condition is met.

2. The control apparatus according to claim 1, wherein the position of the hand is detected based on a central position of a plurality of feature points included in the hand.

3. The control apparatus according to claim 1, wherein the instructions, that when executed by the processor circuit, further cause the processor circuit to:
   measure a duration of a state in which the indicated position overlaps the selectable object;
   in a case where the duration reaches a threshold time, execute the processing associated with the selectable object; and
   in a case where the duration does not reach the threshold time, cease to execute the processing associated with the selectable object.

4. The control apparatus according to claim 1, wherein the instructions, that when executed by the processor circuit, further cause the processor circuit to:
   measure a duration of a state in which the indicated position overlaps the selectable object; and
   change an appearance of a screen that includes the selectable object in accordance with the duration.

5. The control apparatus according to claim 1, wherein
   the instructions, that when executed by the processor circuit, further cause the processor circuit to display, in the display apparatus, a first screen that includes the selectable object and a third selectable object, and
   processing associated with the third selectable object includes displaying, in the display apparatus, a fourth screen that indicates a plurality of functions that the user can execute.

6. The control apparatus according to claim 1, wherein the instructions, that when executed by the processor circuit, further cause the processor circuit to:
   identify that the user is a particular person based on an image of the hand; and
   control a display of a screen in accordance with a setting specific to the particular person.

7. A non-transitory storage medium storing a program for causing a computer to function as the control apparatus according to claim 1.

8. A control apparatus for providing a user interface to a user, the apparatus comprising at least one processor circuit and a memory storing instructions, that when executed by the processor circuit, cause the processor circuit to at least:
   display a selectable object on a display apparatus;
   analyze an image of a hand of the user to detect a position of the hand;
   specify an indicated position in the display apparatus based on the position of the hand;
   display, in the display apparatus, a cursor that indicates the indicated position; and
   based on the indicated position overlapping the selectable object, execute processing associated with the selectable object, wherein
   the processing associated with the selectable object includes switching a display of a first screen that includes the selectable object to a display of a second screen that includes a second selectable object, and
   the instructions, that when executed by the processor circuit, further cause the processor circuit to, in a case where the indicated position at a start of the display of the second screen overlaps the second selectable object, automatically move the indicated position to a position at which the indicated position does not overlap any selectable object in the second screen.

9. A non-transitory storage medium storing a program for causing a computer to function as the control apparatus according to claim 8.

10. A control apparatus for providing a user interface to a user, the apparatus comprising at least one processor circuit and a memory storing instructions, that when executed by the processor circuit, cause the processor circuit to at least:
    display a selectable object on a display apparatus;
    analyze an image of a hand of the user to detect a position of the hand;
    specify an indicated position in the display apparatus based on the position of the hand;
    display, in the display apparatus, a cursor that indicates the indicated position; and
    based on the indicated position overlapping the selectable object, execute processing associated with the selectable object, wherein
    the processing associated with the selectable object includes switching a display of a first screen that includes the selectable object to a display of a second screen that includes a second selectable object, and
    the instructions, that when executed by the processor circuit, further cause the processor circuit to, in a case where the indicated position at a start of the display of the second screen overlaps a position at which the second selectable object is displayed, automatically display the second selectable object at a position at which the second selectable object does not overlap the indicated position in the second screen.

11. A non-transitory storage medium storing a program for causing a computer to function as the control apparatus according to claim 10.

12. A control apparatus for providing a user interface to a user, the apparatus comprising at least one processor circuit and a memory storing instructions, that when executed by the processor circuit, cause the processor circuit to at least:
    display a selectable object on a display apparatus;
    analyze an image of a hand of the user to detect a position of the hand;
    specify an indicated position in the display apparatus based on the position of the hand;
    display, in the display apparatus, a cursor that indicates the indicated position; and
    based on the indicated position overlapping the selectable object, execute processing associated with the selectable object, wherein
    a first screen that includes the selectable object includes a first switching position and a second switching position that is closer to an edge of the first screen than the first switching position, and
    the instructions, that when executed by the processor circuit, further cause the processor circuit to
      in a case where a duration of a state in which the indicated position overlaps the first switching position reaches a second threshold time, switch a display of the first screen to a display of a third screen, and
      in a case where the duration of the state in which the indicated position overlaps the second switching position reaches a third threshold time, switch the display of the first screen to the display of the third screen, and
      the third threshold time is shorter than the second threshold time.

13. A non-transitory storage medium storing a program for causing a computer to function as the control apparatus according to claim 12.

* * * * *